United States Patent
Oh

(10) Patent No.: US 9,235,405 B2
(45) Date of Patent: Jan. 12, 2016

(54) APPARATUS, SYSTEM AND METHOD FOR UPGRADING FIRMWARE OF ENERGY METERING DEVICE

(71) Applicant: LSIS CO., LTD., Anyang, Gyeonggi-Do (KR)

(72) Inventor: Junghwan Oh, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 64 days.

(21) Appl. No.: 13/669,271

(22) Filed: Nov. 5, 2012

(65) Prior Publication Data

US 2013/0117740 A1 May 9, 2013

(30) Foreign Application Priority Data

Nov. 7, 2011 (KR) .................. 10-2011-0114978

(51) Int. Cl.
  *G06F 9/44* (2006.01)
  *G06F 9/445* (2006.01)
  *H04L 29/08* (2006.01)

(52) U.S. Cl.
  CPC *G06F 8/665* (2013.01); *G06F 8/65* (2013.01); *G06F 9/44* (2013.01); *H04L 29/08072* (2013.01)

(58) Field of Classification Search
  CPC ........................................................ G06F 8/60
  See application file for complete search history.

(56) References Cited

U.S. PATENT DOCUMENTS

| | | | |
|---|---|---|---|
| 7,676,804 B2* | 3/2010 | Ferguson et al. | 717/173 |
| 2003/0145316 A1* | 7/2003 | McKinlay et al. | 717/173 |
| 2003/0231642 A1 | 12/2003 | Mao | |
| 2005/0039178 A1* | 2/2005 | Marolia et al. | 717/168 |
| 2007/0169075 A1* | 7/2007 | Lill et al. | 717/168 |
| 2008/0052699 A1* | 2/2008 | Baker et al. | 717/168 |
| 2011/0258296 A1* | 10/2011 | Garrison Stuber et al. | 709/219 |
| 2013/0138775 A1* | 5/2013 | Shah | 709/219 |

FOREIGN PATENT DOCUMENTS

| | | |
|---|---|---|
| CN | 101436138 | 5/2009 |
| KR | 10-2009-0055074 | 6/2009 |
| KR | 10-0978275 | 8/2010 |

OTHER PUBLICATIONS

Korean Intellectual Property Office Application Serial No. 10-2011-0114978, Office Action dated Apr. 27, 2013, 5 pages.
The State Intellectual Property Office of the People's Republic of China Application Serial No. 201210441658.7, Office Action dated Apr. 27, 2015, 9 pages.

* cited by examiner

*Primary Examiner* — Qing Wu
*Assistant Examiner* — Wynuel Aquino
(74) *Attorney, Agent, or Firm* — Lee, Hong, Degerman, Kang & Waimey

(57) ABSTRACT

An apparatus, system, and method for upgrading firmware of an energy metering device are provided. A method for upgrading firmware of an energy metering device which receives firmware from a server via a network and upgrade firmware includes: transmitting a size of a firmware segment to the server, initializing firmware upgrade, receiving a firmware segment from the server, and controlling the energy metering device to operate with received firmware in response to a request for activating firmware from the server. The server communicates with the energy metering device by using an object model obtained by object-modeling the size of a firmware segment, the firmware segment download, and the activation request.

10 Claims, 5 Drawing Sheets

| LOGICAL IDENTIFIER | —51 |
| FIRMWARE SEGMENT SIZE | —52 |
| FIRMWARE UPGRADE STATE | —53 |
| FIRMWARE UPGRADE START | —54 |
| FIRMWARE DOWNLOAD | —55 |
| FIRMWARE ACTIVATION | —56 |

FIG. 5

| ATTRIBUTE | STRUCTURE |
|---|---|
| 51 — LOGICAL IDENTIFIER | 0.0.44.0.0.255 |
| 52 — FIRMWARE SEGMENT SIZE | 478 |
| 53 — FIRMWARE UPGRADE STATE | 1 |
| 54 — FIRMWARE UPGRADE START | |
| 55 — FIRMWARE DOWNLOAD | |
| 56 — FIRMWARE ACTIVATION | |

FIG. 6

| LOGICAL IDENTIFIER | STRUCTURE |
|---|---|
| 60 — ENTIRE FIRMWARE UPGRADE | 0.0.44.0.0.255 |
| 61 — FIRMWARE-1 UPGRADE | 0.0.44.0.1.255 |
| 62 — FIRMWARE-2 UPGRADE | 0.0.44.0.2.255 |
| 63 — FIRMWARE-3 UPGRADE | 0.0.44.0.3.255 |
| 64 — FIRMWARE-n UPGRADE | 0.0.44.0.n.255 |

APPARATUS, SYSTEM AND METHOD FOR UPGRADING FIRMWARE OF ENERGY METERING DEVICE

CROSS-REFERENCE TO RELATED APPLICATION

Pursuant to 35 U.S.C. §119(a), this application claims the benefit of earlier filing date and right of priority to Korean Application No. 10-2011-0114978, filed on Nov. 7, 2011, the contents of which are hereby incorporated by reference in its entirety.

FIELD OF THE INVENTION

The present invention relates to an apparatus, system, and method for upgrading firmware and, more particularly, to an apparatus, system, and method for upgrading firmware of an energy metering device for metering electrical energy.

DESCRIPTION OF THE RELATED ART

In general, an energy metering device is a device for metering electrical energy, and firmware of such an energy metering device performs a particular function enabling the device to operate as an energy metering device. Namely, firmware of the energy metering device is an embedded code for performing a function of operating the device.

In case of a related art energy metering device, when firmware of the device is required to be upgraded because a function thereof is added or changed, in general, a staff of an electric power company visits the site (home, plant, or the like) where an energy metering device is installed, removes the installed energy metering device, and installs a new energy metering device having upgraded firmware, thus performing firmware upgrading of the energy metering device.

Also, in case of removing and transferring an energy metering device to an electric power company in order to upgrade firmware of the energy metering device in the company, the firmware is upgraded by using a device, e.g., a setting jig, customized for upgrading firmware.

FIG. 1 is a flow chart illustrating a method for updating firmware of the related art energy metering device.

As illustrated in FIG. 1, in case of upgrading firmware, a staff of an electric power supplying company visits a site where an energy metering device is installed (S101), removes the installed energy metering device (S102), installs a new energy metering device having upgraded firmware (S103), and delivers the removed energy metering device to a manufacturer which manufactured the corresponding energy metering device (S104).

FIG. 2 is a schematic view illustrating a system for upgrading firmware of the related art energy metering device.

As illustrated in FIG. 2, the energy metering device 100 delivered to the manufacture is connected to a setting jig 300 as a firmware upgrading device through a firmware upgrading terminal 110, connecting the jig 300 to a jig connection terminal 210 of a computer 200 storing new firmware, thus allowing the energy metering device 100 to receive the new firmware transmitted from the computer 200 through the jig 300 to perform upgrading.

However, the related art upgrading method incurs costs (i.e., cost for the new energy metering device, the removal/installation cost, time required for the removal/installation, and the like). Also, in case of upgrading firmware of the removed energy metering device by using the jig as a separate device, only firmware of the energy metering device manufactured by a pertinent manufacturer can be updated and firmware of an energy metering device manufactured by a different manufacturer cannot be upgraded.

SUMMARY

An aspect of the present invention provides an apparatus, system, and method for upgrading firmware of an energy metering device capable of object-modeling firmware upgrading and remotely upgrading firmware of an energy metering device through a wired or wireless network based on the object modeling.

According to an aspect of the present invention, there is provided an apparatus for upgrading firmware of an energy metering device in a system including a server transmitting firmware, comprising:
a communication unit that transmits and receives firmware upgrade information including an object model to and from the server via a network, and receive firmware from the server;
a first storage unit that stores the received firmware; and
a controller that controls the first storage unit to store the received firmware, and control the energy metering device to be driven with the firmware stored in the first storage unit.

The apparatus may further include: a second storage unit that stores firmware being currently operated.

The object model may include: an identifier identifying a pertinent object mode as firmware upgrade;
a firmware segment size as a size of a segment transmitted once by the server to the energy metering device;
a firmware upgrade state;
a firmware upgrade start to notify the energy metering device about starting of firmware upgrading, by the server; and a firmware activation to activate reception-completed firmware.

According to another aspect of the present invention, there is provided a method for upgrading firmware by a server that transmits firmware to be used for upgrading by an energy metering device via a network, comprising:
requesting a size of a firmware segment of the energy metering device;
transmitting a start of firmware upgrade;
transmitting a firmware segment to the energy metering device based on a size of the firmware segment; and
transmitting a request for activating the transmission-completed firmware to the energy metering device.

The transmitting of the firmware segment to the energy metering device may be repeatedly performed until when the transmission of a plurality of firmware segments is completed.

According to another aspect of the present invention, there is provided a method for upgrading firmware of an energy metering device which receives firmware from a server via a network and upgrade firmware, comprising:
transmitting a size of a firmware segment to the server;
initializing firmware upgrade; receiving a firmware segment from the server; and
controlling the energy metering device to operate with received firmware in response to a request for activating firmware from the server.

The initializing may include checking an overall size of the firmware to be received, and determining the number of firmware segments to be received.

The method may further include: acknowledgement notifying the server that data has been received from the server.

The method may further comprising:

object-modeling an identifier that identifies a pertinent object model as firmware upgrade, and determining whether or not firmware upgrading is requested upon checking the identifier.

The receiving of the firmware segment from the server may be repeatedly performed until when transmission of a plurality of firmware segments is completed.

According to another aspect of the present invention, there is provided a system comprising:

a server that transmit firmware to an energy metering device via a network; and the energy metering device that receive the firmware from the server via the network, wherein the firmware is modeled as an object model such that the server and the energy metering device recognize firmware upgrading, and wherein the object model comprises:

an identifier that identifies a pertinent object mode as firmware upgrade;

a firmware segment size as a size of a segment transmitted once by the server to the energy metering device;

a firmware upgrade state;

a firmware upgrade start that notifies the energy metering device about starting of firmware upgrading, by the server; and a firmware activation that activates reception-completed firmware.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an exemplary view of a firmware upgrade object model according to an example embodiment of the present invention;

FIG. 6 is an exemplary view of logical identifiers of a plurality of object models according to an example embodiment of the present invention;

DETAILED DESCRIPTION

The terminology used herein is for the purpose of describing particular embodiments only and is not intended to be limiting of the invention.

It will be understood that, although the terms first, second, etc. may be used herein to describe various elements, these elements should not be limited by these terms. These terms are only used to distinguish one element from another.

It will be understood that when an element is referred to as being "connected with" another element, it can be directly connected with the other element or intervening elements may also be present. In contrast, when an element is referred to as being "directly connected with" another element, there are no intervening elements present.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Hereinafter, embodiments of the present invention will be described in detail with reference to the accompanying drawings.

Figure 1:
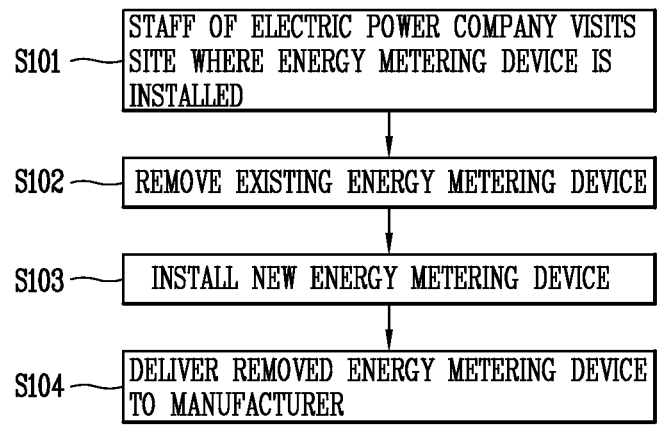
FIG. 1 is a flow chart illustrating a method for upgrading firmware of a related art energy metering device.
Figure 2:
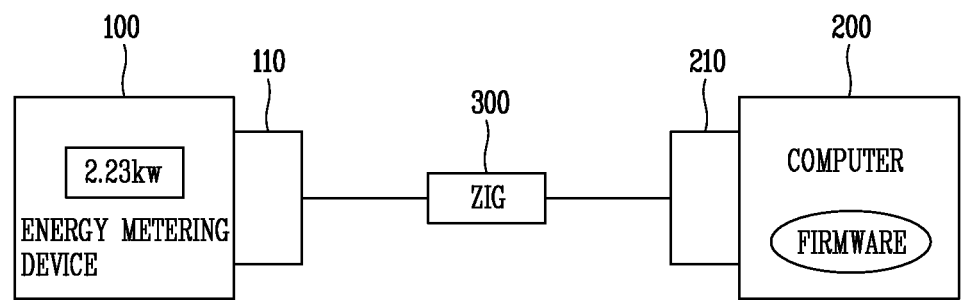
FIG. 2 is a schematic view illustrating a system for upgrading firmware of the related art energy metering device.
Figures 3, 4:
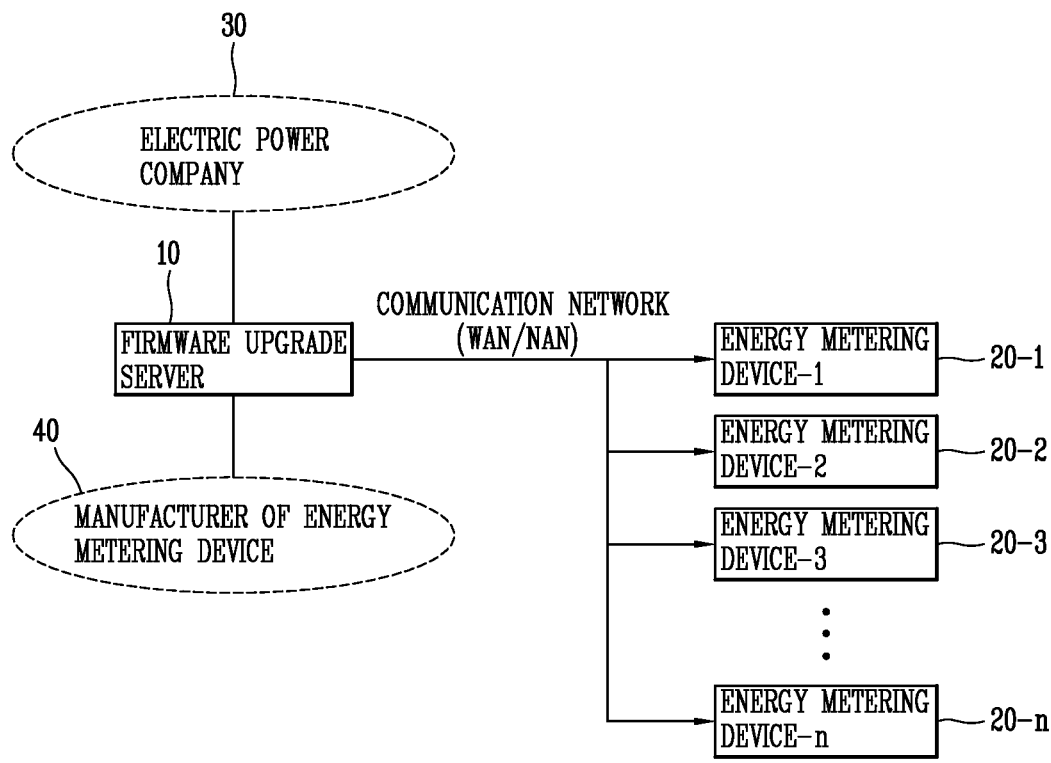
FIG. 3 is a view illustrating a configuration of a system for upgrading firmware according to an example embodiment of the present invention.
FIG. 4 is an exemplary view conceptually illustrating object modeling with respect to firmware upgrading according to an example embodiment of the present invention.

FIG. 3 is a view illustrating a configuration of a system for upgrading firmware according to an example embodiment of the present invention.

As illustrated in FIG. 3, the system according to an example embodiment of the present invention includes a firmware upgrade server 10 and a plurality of energy metering devices 20 connected to the firmware upgrade server 10 via a network. For the description purpose, n number of energy metering devices will be taken as an example. Namely, in FIG. 3, nth energy metering device is expressed as 'energy metering device-n' and designated by numeral '20-n'. This type of energy metering device will be generally referred to as 'energy metering device 20', hereinafter.

The firmware upgrade server 10 is connected to severs of an electric power company 30 and an energy metering device manufacturer 40 via a wired or wireless network. Also, the firmware upgrade server 10 is connected to the plurality of energy metering devices 20 via a wired network or wireless network. In FIG. 3, connections using a wired network are illustrated, but it does not exclude connections via a wireless network. Here, preferably, the network is a Wide Area Network (abbreviated as WAN) or a Neighborhood Area Network (abbreviated as NAN), but the present invention is not limited thereto.

The firmware upgrade server 10 transmits firmware of the energy metering device 20 via a wired/wireless network. This will be described in more detail with reference to the accompanying drawings later.

FIG. 4 is an exemplary view conceptually illustrating object modeling with respect to firmware upgrading according to an example embodiment of the present invention.

In general, object modeling refers to organizing operations and characteristics of objects desired to be implemented as a program.

As illustrated in FIG. 4, object modeling used in the system according to an embodiment of the present invention includes logical identifier 51, firmware segment size 52, firmware upgrade state 53, firmware upgrade start 54, firmware download 55, and downloaded firmware activation 56.

The logical identifier 51 identifies a corresponding object model as firmware upgrade. The logical identifier 51 may have a structure of octet-string comprised of 6 bytes, but the present invention is not limited thereto.

As for the firmware segment size 52, when the firmware upgrade server 10 transmits firmware to the energy metering device 20, the firmware upgrade server 10 divide the firmware into several segments to transmit the firmware, and here, the firmware segment size 52 indicates a size of a segment transmitted and received once. In the present embodiment, for example, the firmware segment size 52 may be 4 bytes and an unsigned long, but the present invention is not limited thereto.

The firmware upgrade state 53 is, for example, comprised of enumerated data having a size of 1 byte. The enumerated data includes firmware upgrade not initialized (0), firmware download initialized (1), firmware upgrade successful (2), and firmware upgrade failure (3). However, obviously, the use of other data is not excluded.

The firmware upgrade start 54 is notifying the energy metering device 20 about start of firmware upgrading, by the firmware upgrade server 10, and the firmware download 55 is actually transmitting firmware from the firmware upgrade server 10 to the energy metering device 20. The downloaded firmware activation 56 is activating downloaded firmware.

FIG. 5 is an exemplary view of a firmware upgrade object model according to an example embodiment of the present invention. As illustrated in FIG. 5, a logical identifier 51 comprised of 6 bytes is '0.0.44.0.0.255', and the firmware upgrade server 10 and the energy metering device 20 mutually recognize that a command transmitted from the firmware upgrade server 10 via a wired or wireless network and a command received by the energy metering device 20 via a wired or wireless network are firmware upgrade based on the logical identifier 51. In the example of FIG. 5, the firmware segment size 52 is 478 bytes, and the current firmware upgrade state 53 is 1 (that is "firmware upgrade initialized state").

The system for upgrading firmware according to an example embodiment of the present invention may model a plurality of firmware upgrade objects by using the object modeling as shown in FIG. 4, and in this case, the plurality of object models may be that have the same characteristics. FIG. 6 is an exemplary view of logical identifiers of a plurality of object models according to an example embodiment of the present invention.

As illustrated in FIG. 6, a logical identifier 60 of the entire firmware upgrade objects is '0.0.44.0.0.255', a logical identifier 61 of a firmware-1 upgrade object is '0.0.44.0.1.255', a logical identifier 62 of a firmware-2 upgrade object is '0.0.44.0.2.255', a logical identifier 63 of a firmware-3 upgrade object is '0.0.44.0.3.255', and a logical identifier 64 of a firmware-n upgrade object is '0.0.44.0.n.255'.

Here, firmware may be discriminated by function based on roles performed in the energy metering device 20. For example, firmware-1 may be classified to have a metering function, firmware-2 may be classified to have a measuring function, and firmware-3 may be classified to have a communication function, and only firmware having a particular function may be upgraded by using the object models according to an embodiment of the present invention.

Figure 7:
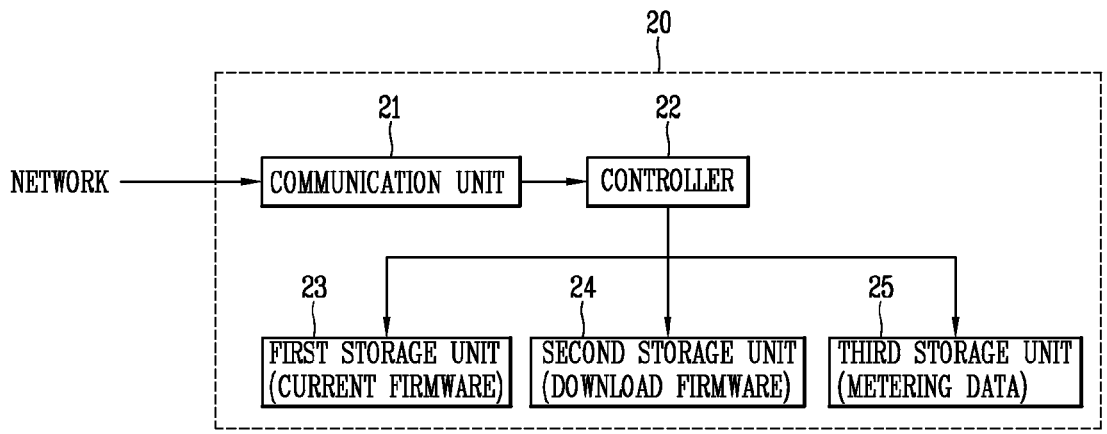
FIG. 7 is a block diagram of an apparatus for upgrading firmware according to an example embodiment of the present invention.

FIG. 7 is a block diagram of an apparatus for upgrading firmware according to an example embodiment of the present invention, and the apparatus for upgrading firmware is included in an energy metering device. In order to explaining that the apparatus for upgrading firmware is included in the energy metering device 20, the configuration is illustrated as shown in FIG. 7, but, obviously, any other components may also be included in the energy metering device 20. Other functions and configurations of the energy metering device 20 unrelated to the present invention are the same as those widely known in the art to which the present invention pertains, so a detailed description thereof will be omitted.

As illustrated in FIG. 7, the apparatus for upgrading firmware according to an example embodiment of the present invention includes a communication unit 21, a controller 22, and a first to a third storage units 23 to 25.

The communication unit 21 transmits and receives information regarding firmware upgrading including an object model through communication with the firmware upgrade sever 10 via a wired/wireless network, and receives firmware from the firmware upgrade server 10.

The first storage unit 23 stores firmware being currently operated, the second storage unit 24 stores firmware received by the communication unit 21 under the control of the controller 22, and the third storage unit 25 stores energy data metered by the energy metering device 20.

The controller 22 controls the second storage unit 24 to store the firmware received by the communication unit 21, and controls the energy metering device 20 to be driven by the firmware stored in the second storage unit 24 according to (in other words responding to) a request 45 for activation of an object model.

The first to third storage units 23 to 25 are discriminated for the description purpose, and separate sectors may be defined in a single memory to store data, respectively. Also, as for the first and second storage units 23 and 24, the first storage unit 23 may store current firmware, and when firmware to be used for upgrading is downloaded, it is stored in the second storage unit 24, and here, when the received firmware is activated, a current firmware is the firmware stored in the second storage unit 24. Even in this case, the controller 22 may not need to move the firmware stored in the second storage unit 24 to the first storage unit 23 to store the same therein. In this case, the second storage unit 24 stores the current firmware, and when firmware to be used for upgrading is received newly, a storage unit to store the received firmware is the first storage unit 23. The controller 22 may control any one of the first storage unit 23 and the second storage unit 24, which has not stored current firmware, to store the received firmware to be used for upgrading.

Figure 8:
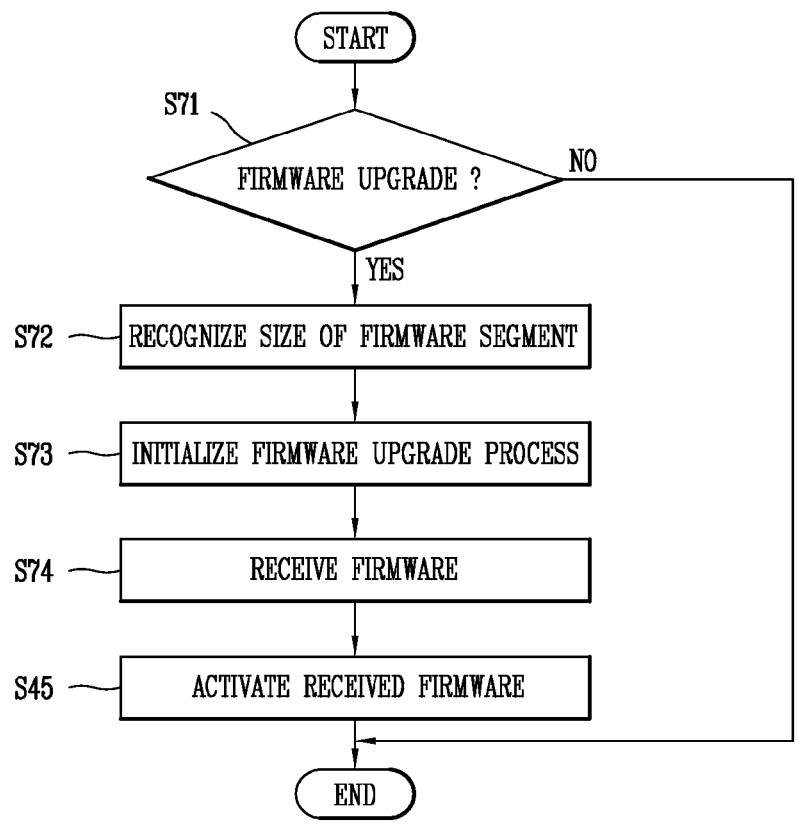
FIG. 8 is a flow chart illustrating a method for upgrading firmware according to an example embodiment of the present invention.

FIG. 8 is a flow chart illustrating a method for upgrading firmware according to an embodiment of the present invention, which shows a procedure performed in the controller 22 of FIG. 7.

As illustrated in FIG. 8, the controller 22 according to an example embodiment of the present invention checks the logical identifier 51 of an object model received from the firmware upgrade server 10, and when firmware upgrading is required (S71), the controller 22 recognizes the firmware segment size 52 of the object model (S72), and initializes a firmware upgrade process (S73). The initializing of the firmware upgrade process includes checking an overall size of firmware to be received and determining how many firmware segments are to be received.

The controller 22 receives firmware from the firmware upgrade server 10 (S74). Preferably, the controller 22 repeatedly performs step S74 until when all the segments of the firmware to be received are received. Thereafter, the controller 22 activates the received firmware (S75).

Figure 9:
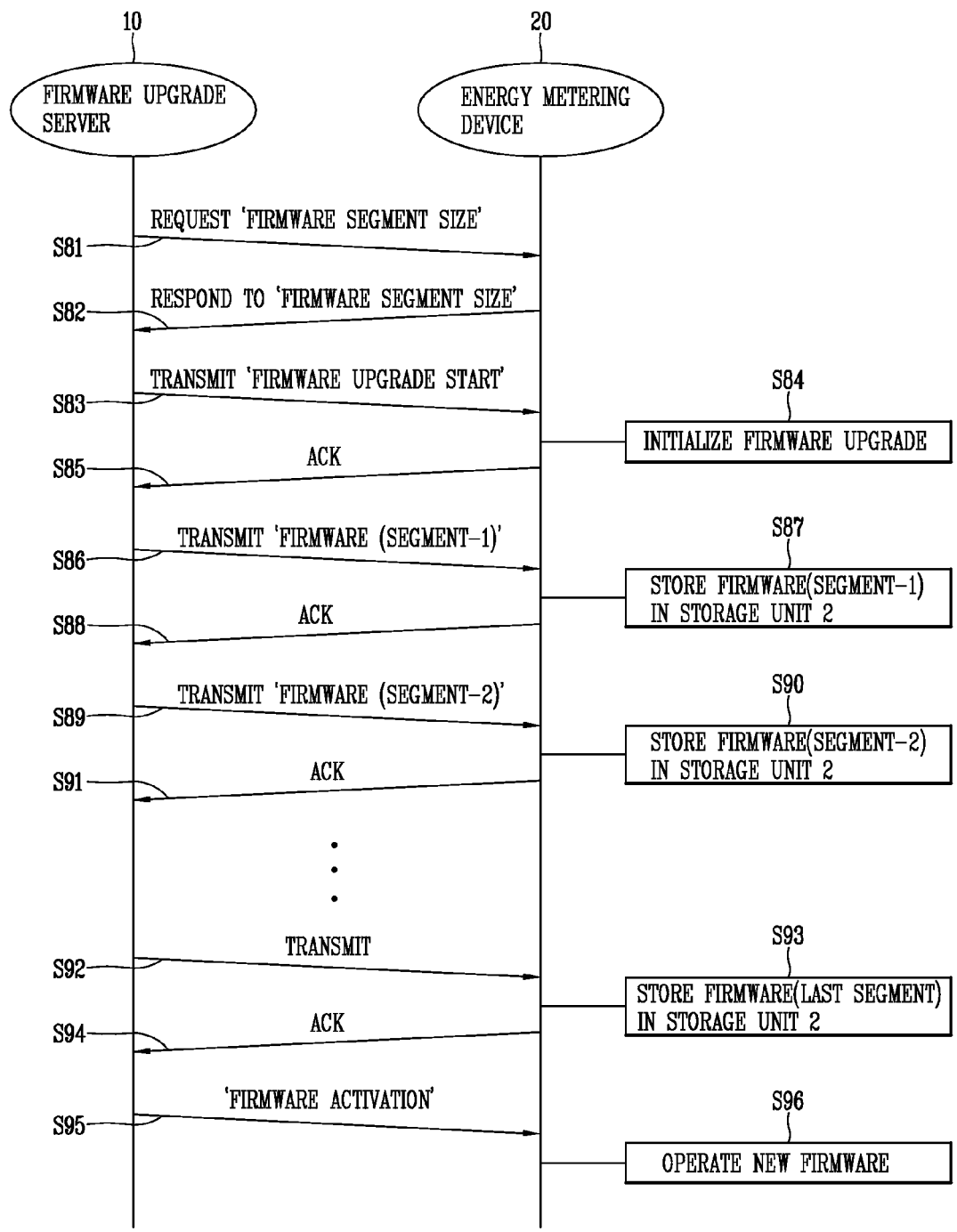
FIG. 9 is an exemplary view illustrating a sequence of a method for upgrading firmware according to an example embodiment of the present invention.

FIG. 9 is an exemplary view illustrating a sequence of a method for upgrading firmware according to an example embodiment of the present invention, in which flows of signals between the firmware upgrade server 10 and the energy metering device 20, in particular, the controller 22, are illustrated correlatively. Both the firmware upgrade server 10 and the energy metering device 20 have already recognized the object model modeled by a user.

The firmware upgrade server 10 requests a size of a firmware segment the energy metering device 20 is able to receive at a time, to the energy metering device 20 (S81). Upon receiving the request for a size of a firmware segment, the energy metering device 20 responds thereto (S82). For example, the energy metering device 20 may transmit 478 bytes. A response of the energy metering device 20 may constitute the firmware segment size 52 of the object model in FIG. 3.

Thereafter, the firmware upgrade server 10 transmits the firmware upgrade start 54 of the object mode (S83), and the energy metering device 20 receives the firmware upgrade start 54 to prepare a storage unit (the second storage 24 in FIG. 6) for receiving firmware from the firmware upgrade server 10 and storing the same, and checks an overall size of the firmware to be received to perform firmware upgrade initialization including determining how many firmware segments are to be received (S84). Thereafter, the energy metering device 20 notifies the firmware upgrade server 10 that it has received the firmware upgrade start 54 (acknowledgement, abbreviated as ACK hereinafter) (S85).

The firmware upgrade server 10 transmits a first firmware segment based on the size of the firmware segment to the energy metering device 20 (S86). The energy metering device 20 receives the first firmware segment through the communication unit 21, and the controller 22 controls the second storage unit 24 to store the received first firmware segment (S87). The energy metering device 20 notifies the firmware upgrade server 10 that it has received the first firmware segment (ACK) (S88).

Thereafter, the firmware upgrade server 10 transmits a second firmware segment based on the size of the firmware segment to the energy metering device 20 (S88). The energy metering device 20 receives the second firmware segment through the communication unit 21, and the controller 22 controls the second storage unit 24 to store the received second firmware segment (S90). The energy metering device 20 notifies the firmware upgrade server 10 that it has received the second firmware segment (ACK) (S91).

The foregoing operation is performed until when the firmware is completely transmitted from the firmware upgrade server 10 to the energy metering device 20 (S92 to S94).

When the transmission of the firmware is completed, the firmware upgrade server 10 transmits the firmware activation 56, and the controller 22 of the energy metering device 20 operates the energy metering device 20 with new firmware stored in the second storage unit 24, instead of the firmware already stored in the first storage unit 23.

According to an aspect of the present disclosure, firmware upgrading of the energy metering device 20 is object-modeled such that the firmware upgrade server 10 managing and operating firmware and a plurality of heterogeneous energy metering devices 20 connected to the firmware upgrade server 10 through a communication medium can recognize and discriminate the firmware upgrading. Also, according to the other aspect of the present disclosure, the firmware upgrade server 10 transmits object-modeled firmware to the energy metering device 20 by using a wired/wireless network, and the energy metering device 20 stores the received firmware in an internal storage unit thereof, and when a firmware activation request is received from the firmware upgrade server 10, the energy metering device 20 operates with the new firmware stored in the storage unit.

According to the other aspect of the present disclosure, since firmware upgrade of the energy metering device 20 is object-modeled, and firmware of the energy metering device 20 is remotely upgraded based on the object modeling, whereby firmware of the energy metering device 20 can be effectively upgraded. In particular, in the an example embodiment of the present invention, since firmware of the energy metering device is remotely upgraded based on object modeling, costs (i.e., cost for the new energy metering device, removal/installation cost, time required for removal/installation, and the like), incurred to upgrade firmware of the related art energy metering device can be reduced. Also, since firmware is remotely upgraded by a server, a time required for upgrading the firmware can be shortened.

The example embodiments of the present invention may be implemented by recording a computer-readable program code in a computer-readable recording medium. When the example embodiments of the present invention are executed by using software, the constituents of the example embodiments of the present invention are code segments. The program or code segments may be stored in a medium readable by a processor of a computer or may be transmitted by a computer data signal combined with a carrier from a transmission medium or a communication network.

The computer-readable recording medium includes all types of recording devices storing data readable by computer systems. Examples of the computer readable recording medium include ROM, RAM, CD-ROM, magnetic tapes, floppy disks, optical data storage devices, and the like. The computer-readable recording medium may be distributed over network-coupled computer systems so that the computer-readable code may be stored and executed in a distributed fashion.

As the present invention may be embodied in several forms without departing from the characteristics thereof, it should also be understood that the above-described example embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus configured to upgrade firmware of an energy metering device in a system including a server, the apparatus comprising:

a communication unit configured to communicate with the server over a network, using firmware upgrade information including a plurality of object oriented data models, wherein each of the plurality of object oriented data models are classified by a corresponding logical identifier which is determined by a function according to the upgrade firmware to be implemented by the energy metering device such that the plurality of object oriented data models, which are associated with the same function according to the upgrade firmware, have the same logical identifier, at least one storage unit; and a controller configured to:
receive a first object oriented data model, a first object of the first object oriented data model representing asking the size of firmware segment the energy metering device is able to receive at a time from the server and a second object of the first object oriented data model representing the logical identifier, send a second object oriented data model, a first object of the second object oriented data model representing the asked size of the firmware segment and the second object of the second object oriented data model representing the logical identifier,
receive at least one firmware segment to the energy metering device based on the asked size of the firmware segment,
receive a third object oriented data model, a first object of the third object oriented data model representing the server's order to start firmware upgrade and a second object of the third object oriented data model representing the logical identifier,
send a fourth object oriented data model, a first object of the fourth object oriented data model representing a status of starting the firmware upgrade in response to the received server's order and a second object of the fourth object oriented data model representing the logical identifier,
send a fifth object oriented data model, a first object of the fifth object oriented data model representing a status of the firmware upgrade in progress, a second object and a second date item of the fifth object oriented data model representing the logical identifier,
send a sixth object oriented data model, a first object of the sixth object oriented data model indicating completion of the firmware upgrade and a second object of the sixth object oriented data model representing the logical identifier, and
operate the upgraded firmware when the server transmits a seventh object oriented model, a first object of the seventh object oriented data model representing the server's order to activate the upgraded firmware and a second object of the seventh object oriented data model representing the logical identifier.

2. A method for upgrading firmware of an energy metering device by a server via a network, the method using firmware upgrade information including a plurality of object oriented data models, wherein each of the plurality of object oriented data models are classified by a corresponding logical identifier which is determined by a function according to the upgrade firmware to be implemented by the energy metering device such that the plurality of object oriented data models, which are associated with the same function according to the upgrade firmware, have the same logical identifier, the method comprising:
sending a first object oriented data model, a first object of the first object oriented data model representing asking the size of firmware segment the energy metering device is able to receive at a time from the server and a second object of the first object oriented data model representing the logical identifier;
receiving a second object oriented data model, a first object of the second object oriented data model representing the asked size of the firmware segment and the second object of the second object oriented data model representing the logical identifier;
sending a third object oriented data model, a first object of the third object oriented data model representing the server's order to start firmware upgrade and a third object of the third object oriented data model representing the logical identifier;
transmitting at least one firmware segment to the energy metering device based on the asked size of the firmware segment;
upon completion of firmware upgrading, receiving a fourth object oriented data model, a first object of the fourth object oriented data model indicating completion of the firmware upgrade and a second object of the fourth object oriented data model representing the logical identifier; and
requesting activation of the upgraded firmware to the energy metering device.

3. The method of claim 2, wherein the transmitting of the at least one firmware segment to the energy metering device is repeatedly performed by the server until all of firmware segments are transmitted.

4. A method for upgrading firmware by an energy metering device which receives firmware from a server via a network, the method using firmware upgrade information including a plurality of object oriented data models, wherein each of the plurality of object oriented data models are classified by a corresponding logical identifier which is determined by a function according to the upgrade firmware to be implemented by the energy metering device such that the plurality of object oriented data models, which are associated with the same function according to the upgrade firmware, have the same logical identifier, the method comprising:
receiving a first object oriented data model, a first object of the first object oriented data model representing asking the size of firmware segment the energy metering device is able to receive at a time from the server and a second object of the first object oriented data model representing the logical identifier;
sending a second object oriented data model, a first object of the second object oriented data model representing the asked size of the firmware segment and the second object of the second object oriented data model representing the logical identifier;
receiving a third object oriented data model, a first object of the third object oriented data model representing the server's order to start firmware upgrade and a second object of the third object oriented data model representing the logical identifier;
initializing the firmware upgrade;
sending a fourth object oriented data model, a first object of the fourth object oriented data model representing a status of starting the firmware upgrade in response to the received server's order and a second object of the fourth object oriented data model representing the logical identifier;
receiving at least one segment of the upgraded firmware from the server; and
sending a fifth object oriented data model, a first object of the fifth object oriented data model representing a status of the firmware upgrade in progress, a second object and a second date item of the fifth object oriented data model representing the logical identifier;
upon completion of firmware upgrading, sending a sixth object oriented data model, a first object of the sixth object oriented data model indicating completion of the firmware upgrade and a second object of the sixth object oriented data model representing the logical identifier; and
operating the upgraded firmware when the server transmits a seventh object oriented model, a first object of the seventh object oriented data model representing the server's order to activate the upgraded firmware and a second object of the seventh object oriented data model representing the logical identifier.

5. The method of claim 4, wherein the initializing comprises:
checking an overall size of the firmware upgrade to be received, and determining a number of the at least one firmware segments to be received.

6. The method of claim 4, wherein the receiving the at least one firmware segment from the server is repeatedly performed until when all firmware segments have been received.

7. A system for upgrading firmware of an energy metering device, comprising:
- a server configured to transmit a firmware to the energy metering device via a network; and
- the energy metering device,
- wherein the firmware is modeled with a plurality of object oriented data models such that the server and the energy metering device recognize firmware upgrading,
- wherein each of the plurality of object oriented data models are classified by a corresponding logical identifier which is determined by a function according to the upgrade firmware to be implemented by the energy metering device such that the plurality of object oriented data models, which are associated with the same function according to the upgrade firmware, have the same logical identifier, and wherein the server is configured to
  - send a first object oriented data model, a first object of the first object oriented data model representing asking the size of firmware segment the energy metering device is able to receive at a time from the server and a second object of the first object oriented data model representing the logical identifier,
  - receive a second object oriented data model, a first object of the second object oriented data model representing the asked size of the firmware segment and the second object of the second object oriented data model representing the logical identifier,
  - send a third object oriented data model, a first object of the third object oriented data model representing the server's order to start firmware upgrade and a third object of the third object oriented data model representing the logical identifier,
  - transmit a at least one firmware segment to the energy metering device based on the asked size of firmware segment,
  - upon completion of firmware upgrading, receive a fourth object oriented data model, a first object of the fourth object oriented data model indicating completion of firmware upgrade and a second object of the fourth object oriented data model representing the logical identifier, and
  - request activation of the upgraded firmware to the energy metering device.

8. The apparatus of claim 1, wherein the logical identifier of each of the plurality of object oriented data models comprises numerical data constructed of bytes and is included in the corresponding object oriented data model.

9. The apparatus of claim 8, wherein a certain portion of the numerical data is changed in a preset manner to indicate that a different firmware is available to be downloaded to the energy metering device.

10. The system of claim 7, wherein the energy metering device is configured to:
- receive a fifth object oriented data model, a first object of the fifth object oriented data model representing asking a size of the firmware segment and a second object of the fifth object oriented data model representing the logical identifier,
- send a sixth object oriented data model, a first object of the sixth object oriented data model representing the asked size of the firmware segment and a second object of the sixth object oriented data model representing the logical identifier,
- receive a seventh object oriented data model, a first object of the seventh object oriented data model representing the server's order to start firmware upgrade and a second object of the seventh object oriented data model representing the logical identifier,
- send a eighth object oriented data model, a first object of the eighth object oriented data model representing a status of starting the firmware upgrade in response to the received server's order and a second object of the eighth object oriented data model representing the logical identifier,
- send an ninth object oriented data model, a first object of the ninth object oriented data model representing a status of the firmware upgrade in progress and a second object of the ninth object oriented data model representing the logical identifier,
- send a tenth object oriented data model, a first object of the tenth object oriented data model representing completion of the firmware upgrade and a second object of the tenth object oriented data model representing the logical identifier, and
- operate the upgrade firmware when the server transmits a eleventh object oriented model, a first object of the eleventh object oriented data model representing the server's order to activate the upgraded firmware and a second object of the eleventh object oriented data model representing the logical identifier.

* * * * *